United States Patent
Grant

[15] 3,646,737
[45] Mar. 7, 1972

[54] HARVESTING ATTACHMENT

[72] Inventor: Benjamin M. Grant, Route 1, Box 43, Pasco, Wash. 99301

[22] Filed: Oct. 20, 1970

[21] Appl. No.: 82,333

[52] U.S. Cl. ............................................... 56/106,
[51] Int. Cl. ............................................... A01d 45/02
[58] Field of Search .................... 56/119, 103, 104, 105, 106, 56/317, 99, 98

[56] References Cited

UNITED STATES PATENTS

| 953,265 | 3/1910 | Ginaca | 56/99 |
| 3,331,196 | 7/1967 | Grant | 56/106 |
| 3,572,018 | 3/1971 | Broussard | 56/98 |

*Primary Examiner*—Antonio F. Guida
*Attorney*—Beveridge & DeGrandi

[57] ABSTRACT

A down corn attachment for mounting on the row dividers of a corn head for a combine. The row dividers have a pointed snout mounted on their forward end for vertical pivotal movement to accommodate ground irregularities. The down corn attachment includes a conveyor chain driven about an endless path including a conveying run extending from the forward point of the snout along the top surface of the row divider to the rear thereof. The conveyor chain is employed to apply a moment to the snout about its pivot axis to support a portion of the cantilevered weight of the snout.

24 Claims, 9 Drawing Figures

INVENTOR
BENJAMIN M. GRANT

BY *Beveridge & DeGrandi*

ATTORNEYS

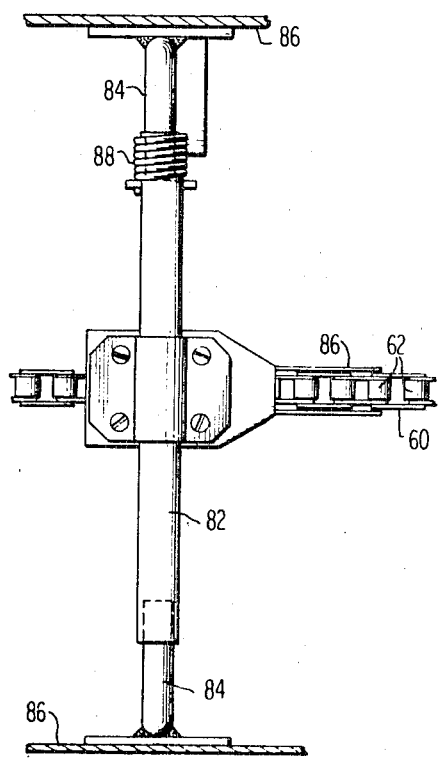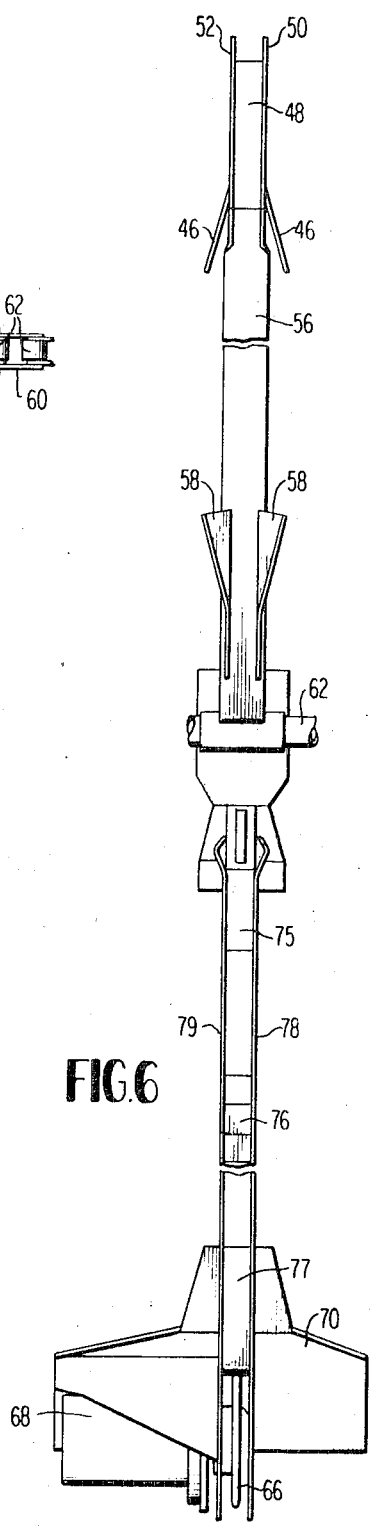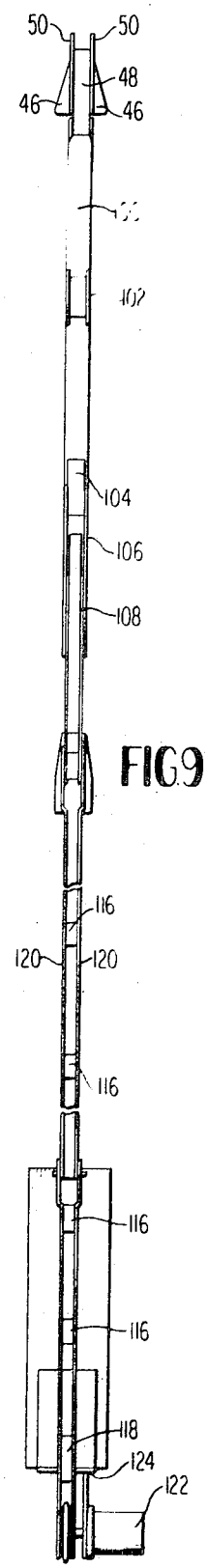

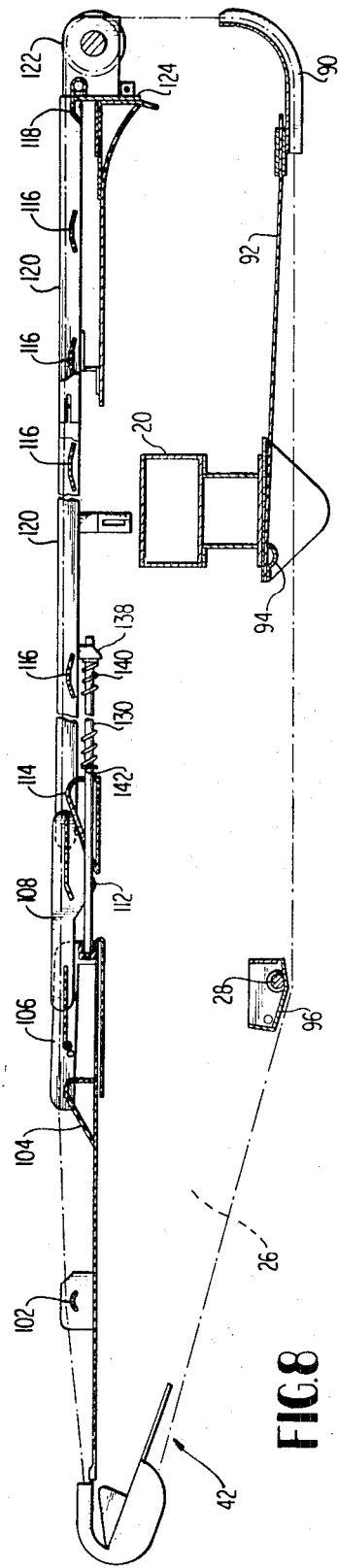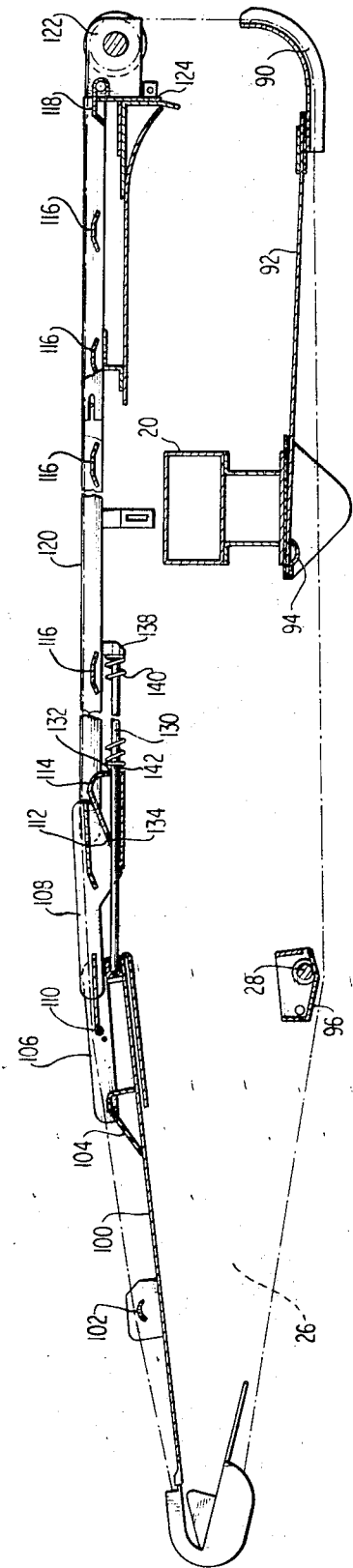

HARVESTING ATTACHMENT

BACKGROUND OF THE INVENTION

1. Field of the Invention

This invention relates generally to corn-harvesting equipment, and more particularly to an improved crop-gathering attachment for the corn head of a corn-picking apparatus. Specifically, the invention relates to an improved attachment for a corn head of the type employed on conventional combines to enable the apparatus to be more effectively employed to harvest corn when all or a portion of the crop has fallen or been knocked down (down corn) as a result of heavy winds, rains, or the like. The apparatus is particularly useful in harvesting down corn under adverse conditions such as muddy or frozen fields, light snow, or the like.

2. Description of the Prior Art

Cornpickers conventionally are constructed with a plurality of forwardly and downwardly inclined row dividers positioned to extend one on each side of a row of corn being picked as the equipment progresses through the field. These row dividers are provided with a pointed snout portion on their forward end which moves along the ground between the individual rows of corn, and the top surface of the snout and the rigid body portion of the row divider supporting the snout cooperate to form an inclined surface for guiding the individual stalks of corn into the snap rolls. The snouts are pivotally supported on the body of the row divider to permit the forward point of the snout to ride over high areas in the ground. To provide a continuous ramp, or guide surface for the stalks of corn, the surface of the body portion of the row divider extends beneath the surface of the snout portion when the snout is in its fully lowered position, with the snout surface riding over the top of the body as the snout is pivoted upward.

While the prior art corn-picking devices are satisfactory for picking corn which is standing in the row and which therefore feeds automatically into the gathering chains and snaprolls of the corn head, these devices have not been satisfactory for gathering corn crops wherein a substantial portion of the corn is down. Accordingly, attempts have been made to provide collecting conveyors for the row dividers which were adapted to pick down corn from the ground and convey it up over the snouts to deliver it to the snaprolls. One such device is illustrated in my prior U.S. Pat. No. 3,331,196 which employs separate conveyor chains and drive mechanisms for the snout portions and for the body portions of the respective row dividers. While this prior structure satisfactorily performs the function of picking up and delivering the down corn, it is relatively expensive to manufacture and install on a corn head, and adds substantial weight to the forward portion of the row dividers of the head.

SUMMARY OF THE INVENTION

A primary object of the present invention is to provide an attachment for a corn head which will pick up and convey down corn along the row divider and deliver the corn to the snaprolls of the corn head.

Another object is to provide such an attachment which may easily and readily be mounted on existing corn heads, and which will add a minimum of weight to the row dividers.

Another object is to provide such a down corn attachment for a corn head which employs a single conveyor chain extending along the articulated snout and body portion of the row dividers, with the chain being employed to support a portion of the cantilevered weight of the snout portion of the row divider.

The foregoing and other objects are attained in a corn head embodying the present invention in which a chain guide is mounted on the forward, pointed end of the snout, with a single, endless chain conveyor extending over this chain guide and along a conveying path extending above the top surface of the snout and body portion of the row divider to a point at the rear of the row divider. Resilient means are provided for maintaining a tensile load of the endless chain as it is driven about its path, and the stress in the chain passing over the chain guide on the pointed snout is employed to create a moment about the pivot axis of the snout to support a portion of the weight of the snout and thereby reduce the tendency of the snout to dig into the ground. By applying sufficient load to the chain, the pivoted snout may be caused to "float" and means may be provided to prevent the load in the chain from retaining the snout in the elevated position once it has been raised by engagement with a high point in the ground.

BRIEF DESCRIPTION OF THE DRAWINGS

FIG. 5 is a fragmentary sectional view taken along line 5—5 of FIG. 3;

FIG. 6 is a top plan view of the structure shown in FIG. 3, as employed on an inboard row divider;

FIG. 7 is a view similar to FIG. 3 and illustrating an alternate embodiment of the invention;

FIG. 8 is a view similar to FIG. 7 and illustrating certain elements in an alternate position; and FIG. 9 is a top plan view of the structure shown in FIG. 7, as employed on an outboard row divider.

DESCRIPTION OF THE PREFERRED EMBODIMENTS

Figure 1:
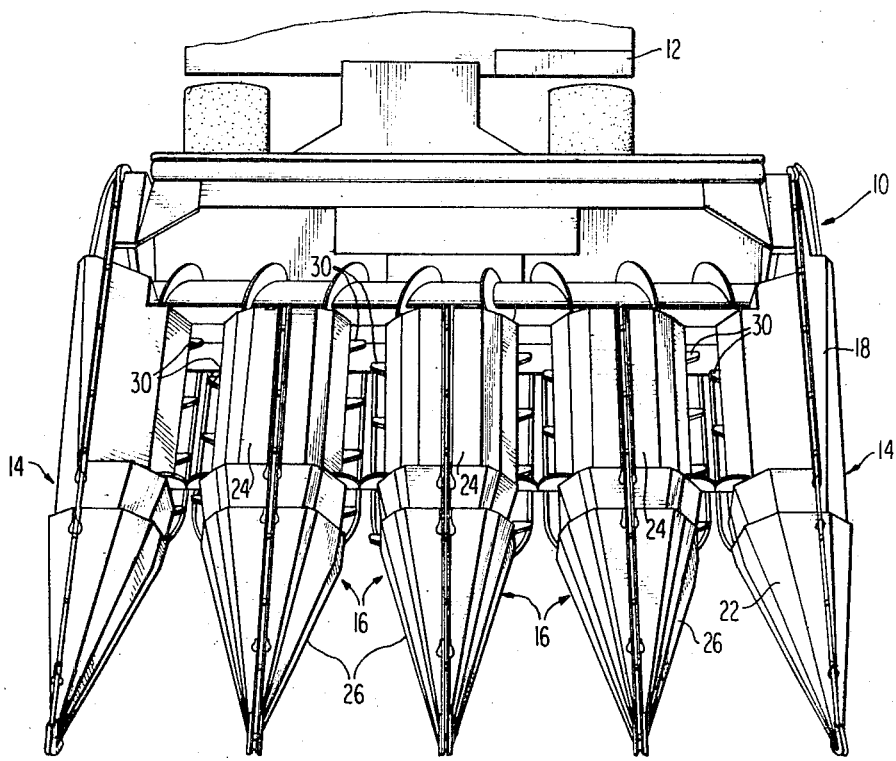
FIG. 1 is a front elevational view of a four-row corn head embodying the present invention and mounted on a combine.
Figure 2:
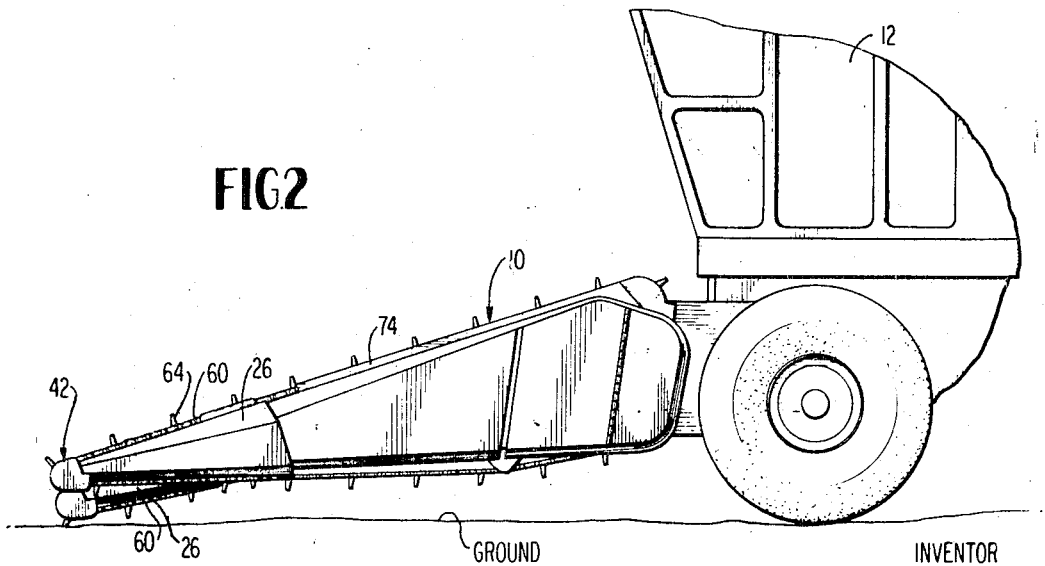
FIG. 2 is a fragmentary sectional view taken along line 2—2 of FIG. 1 and illustrating one of the snouts in an elevated position.

Referring now to the drawings in detail, a corn head embodying the present invention is indicated generally by the reference numeral 10 and is illustrated as mounted on a combine harvester 12. The corn head includes a pair of outboard row dividers 14 mounted, one on each side of the corn head, and one or more inboard row dividers 16 positioned between row dividers 14 and disposed to receive a single row of corn between each of the two adjacent row dividers. The apparatus illustrated in FIG. 1 is a four-row corn head, employing five row dividers, but the invention may be employed with corn heads of any size, it being understood that for a single-row corn head, the inboard row dividers would be eliminated.

The invention is particularly well adapted for use with large corn heads of the type employed to pick up to eight or more rows of corn at a time because of the relatively insignificant weight added to the apparatus by the down corn attachment of this invention.

The outboard row dividers are each made up of a body portion 18 rigidly mounted on an adjustable frame member 20 (see FIGS. 7 and 8) of the combine, and a pointed snout pivotally mounted on the forward end of body 18. The intermediate row divider 16 similarly comprises a rigid body portion 24 with a pointed snout 26 pivotally mounted on the forward end thereof. The snouts 22 and 26 are pivoted to the frame of the base portions 18, 24, respectively adjacent the bottom of the snout as indicated at 28 in FIGS. 3 and 4, with the outer, cone-shaped cowling surface of the respective snouts extending rearwardly in telescoping relation over a portion of the cowling surface of the respective body portions to provide a continuous guiding surface to divide tangled corn stalks and direct them into the gathering chains 30. This construction of the corn head is conventional and is of the type manufactured, for example, by Massey-Ferguson Inc. for use in combination with their standard combine harvesters. Thus, it is understood that the apparatus incorporates conventional driven stalk rolls, or snaprolls, as well as means for driving the conventional gathering chains 30. The purpose of mounting the pointed snouts of the row dividers for pivotal, vertical movement is to permit these pointed snouts to ride close to the ground to run beneath down or tangled corn, and yet permit these snouts to ride upwardly as necessary to traverse uneven ground.

Figure 3:
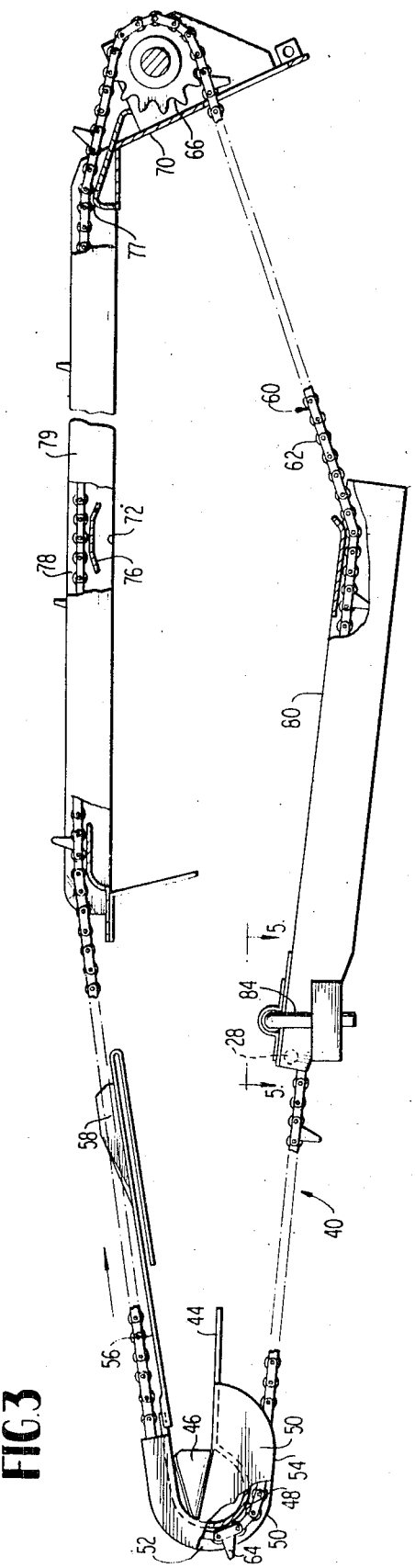
FIG. 3 is a fragmentary side elevational view of the down corn conveyor attachment according to one embodiment of the invention.
Figure 4:
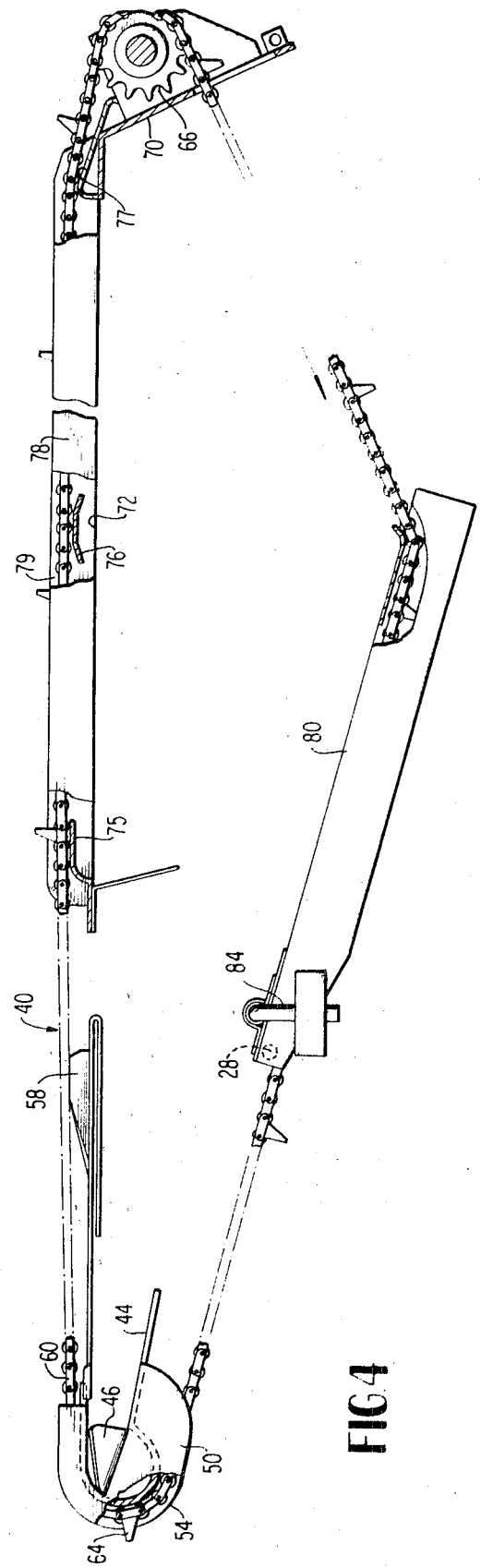
FIG. 4 is a view similar to FIG. 3, with the snout illustrated in an elevated position.

One embodiment of the down corn attachment of the present invention is indicated generally by the reference numeral 40 in FIGS. 3 and 4, and is intended to be mounted on and cooperate with each of the row dividers of a conventional corn head of the type described hereinabove to more efficiently gather down or tangled corn, and to enable the operation of the apparatus under more severe weather and field conditions. A separate attachment is mounted on each of the row dividers of the corn head, with the outboard dividers requiring minor modification from that of the inboard dividers to accommodate the slightly longer and different configuration of the outboard row dividers. Since the slight structural differences between the attachments mounted on the outboard and the inboard dividers are not considered to be of patentable significance, only the attachment for the inboard dividers will be described in detail herein, it being understood that corresponding, though slightly lighter and longer structure is employed on the outboard row dividers.

Referring now to FIGS. 3-6, it is seen that this embodiment of the invention comprises a chain guide boot 42 adapted to be telescoped onto the forward end of the pointed snout 26 and be retained thereon by contact of the plate 44 and the upturned wings 46 of the boot with the outer surface of the pointed snout. The forward portion of the plate 44 is formed into a rounded chain guide 48 which, in combination with opposed sideplates 50 welded onto plate 44, cooperate to define a smooth arcuate track 52 extending in a vertical plane around the pointed end of snout 26. The lower edge surfaces 54 of plates 50 cooperate to define a support shoe to support the forward end of the snout when the snout engages the ground. A narrow metal reinforcing plate 56 extends from the boot 42 rearwardly along the top surface of snout 26, and has its rear end bent into a substantial U-configuration to extend forwardly beneath the sheet metal cover of snout 26 to form a reinforced support for winged chain guides 58 projecting upwardly from the top surface of the snout at spaced intervals therealong. Chain guides 58 are intended to provide lateral support only for the conveyor chain, while leaving the chain "track" open throughout the major portion of its travel along the top surface of snout 26.

The conveyor chain 60 is a high-roller sprocket chain of the type in which the individual rollers 62 are each a low friction bearing adapted to roll along a smooth surface with a minimum of frictional resistance, thereby eliminating the necessity for idler sprockets to change the direction of the conveyor chain. The chain 60 has a plurality of outwardly extending lugs 64 mounted on selective links at approximately 1-foot intervals around its length. These lugs 64 are provided to engage a stalk of down corn and convey it along the upper surface of the row divider to deliver it to the snap rolls. The lugs 64 are of a length to project outwardly beyond the edge of the sideplates 50 of boot 42.

Chain 60 is driven about an endless path extending round the pointed end of snout 26 along the entire top surface of the row divider 26 by a sprocket 66 mounted on a hydraulic motor 68 supported on a bracket 70 at the rear of and below the top surface of the row divider 26. The chain 60 is supported in vertically spaced relation above the top surface 72 of body 24 by a track assembly 74 including a plurality of support brackets 75, 76, 77 mounted on a pair of side guides 78, 79. The brackets 75, 76, 77 support the chain in vertically spaced relation above the surface 72 to avoid the adverse effect of an accumulation of mud on the bottom of the track while operating the apparatus in a muddy field. While the side guides 78, 79 provide substantially continuous lateral support for the chain along the body 24 of the row divider, it is pointed out that the conveyor track is completely open except for the side guides 57 along the portion of the path extending from the boot 42 to the forward end of the track assembly 74 where the tendency for mud to accumulate is the greatest.

A channel-shaped chain guide and tensioning arm 80 is pivotally mounted on the forward end of body 24. The arm 80 is supported by a transverse shaft 82 (see FIG. 5) rotatably supported by a pair of rigid brackets 84 mounted on the body frame 86 near the horizontal pivot 28 of snout 26. A coil torsion spring 88 has one end connected to the bracket 84 and the other end connected to shaft 82 to resiliently urge shaft 82 for rotation in a direction to continuously urge the rear end of arm 80 downward. Spring 88 is a relatively high-strength spring so that arm 80, pushing downward on chain 60 at a point spaced between the sprocket 66 and the boot 42, maintains a substantial tensile load in the chain 60 at all times.

Since the lower run of conveyor chain 60, between the arm 80 and the track 50 passes close to the horizontal pivot axis of the snout 26, with the upper run of the conveyor chain along the top of the snout passing a substantial distance above the pivot axis of the snout, the tensile stress in the chain applies a substantial moment to the snout in a direction tending to rotate the forward point of the snout upward. By maintaining the proper tensile load in the conveyor chain, the major portion of the cantilevered weight of the snout may be carried by the chain so that a minimum of force is required to lift the snout. This is particularly important in operating the apparatus in soft or muddy ground where conventional snouts tend to dig into rather than be lifted by the soft ground.

By maintaining a sufficient stress in chain 60 to maintain the snout near its floating condition, the moment tending to lift the snout will be increased as the snout is lifted to raise the boot 42 further above the pivot axis 28. To partially overcome this tendency, the arm 28 is positioned to move the lower run of the chain downward to maintain its line of action near or below the pivot axis 28 so that the effect of lifting the forward end of the snout on the turning moment will be reduced. It should be apparent that the length of the tension arm 80, and the position of the supporting shaft 82 will determine and/or limit this increase in turning moment, and may even be such as to maintain the moment substantially constant regardless of the pivotal position of the snout. However, it is desired that the conveyor chain be exposed beneath the bottom surface of the snout for at least a short distance rearwardly of the chain guide 42 so that the lugs 64 will be able to engage a stalk of corn lying flat on the ground and convey it forwardly up and over the front of the snout.

Referring now to FIGS. 7 and 8, an alternate embodiment of the invention is illustrated in which the snout 26 is pivoted for vertical movement on the frame of body portion 24 by the conventional pivot shaft 28 as in the previous embodiment. This embodiment employs a chain 60, and a chain guide boot 42 identical to that described above.

The roller chain 60 is maintained under tensile load in this embodiment by a curved guide shoe 90 mounted on one end of an elongated leaf spring 92 having its opposite end rigidly mounted, by a bracket 94, to the frame member 20 of the corn head. A guide plate 96 is supported on and extends between the two side frames 86 of body 24 to engage and support chain 60 at a point adjacent the pivot axis 28 of snout 26. Plate 96 is rigidly mounted to frame 86 so that, as snout 26 is elevated, the angle between the upper and lower runs of chain 60, extending from guide 42 is increased.

The chain 60 is guided and supported along the top surface of snout 26 and body 24 by a guide track assembly including a first elongated flat bar member 100 rigidly mounted on and extending the full length of snout 26 from guide 42 to the rear edge thereof. A first guide bracket 102 is mounted on bar 100 at a point spaced rearwardly from guide 42 and engages chain 60 to elevate the chain above the top surface of snout 26. A second guide assembly mounted on bar 100 includes a ramp 104 with a pair of opposed sideplates 106 rigidly welded thereon and extending rearwardly therefrom to the rear edge of bar 100. A movable chain support guide 108 is pivotally mounted, by a pin 110 to the sideplates 106 and extends rearwardly therefrom spanning the overlap joint between the snout and body. The movable guide has a cam surface 112 engaging a ramp 114 mounted on the body 24 so that, as snout 26 is raised, thereby pushing guide 108 to the rear and simultaneously lifting the chain 60 above the top surface of the row divider, guide 108 is raised to provide vertical support for the chain 60. A plurality of additional chain supports 116, 118 supported by a pair of side guides 120 provide an open bottom track for the chain from ramp 114 to the rear of the row divider. Hydraulic motor 122, mounted on bracket 124 on the rear of body 24 drives the chain about its endless path in the manner described above.

An elongated push rod 130 is slidably supported in a pair of vertically elongated openings 132, 134 in ramp member 114, and has its forward end positioned in a recess in a bearing block 136 rigidly welded to the bar 100 between side guides plates 106. The rear end of push rod 130 extends through an opening in a rigid bracket 138 mounted on side guide members 120, and a coil spring 140 positioned around push rod 130 has one end bearing against the forward vertical face of bracket 138. A pin 142 extending through push rod 140 engages the forward end of spring 140 to maintain the spring in compression between the pin and the bracket 138. Spring 140 continuously urges push rod 130 forward against bearing block 136 to apply a moment tending to rotate snout 26 downward, or in a direction opposite to the moment applied by tension in the chain 60.

From the above, it is seen that, as the snout 26 is raised, spring 140 will be compressed to increase the moment tending to urge the snout downward while, at the same time, the tensile load in the chain 60 will, as a result of raising the forward end of the snout, increase the moment tending to raise the snout so that these increased moments tend to cancel one another. Also, as snout 26 is raised, thereby shortening the length of the top run of the conveyor chain, spring 92 will urge guide shoe 90 downward to take up the slack in the chain and to maintain it under tension. However, as guide shoe 90 moves further down, the force applied by spring 92 is decreased slightly, correspondingly reducing the tensile load in the chain. The combination of these forces producing moment tending to rotate snout 26 about axis 28 can be balanced to provide a substantially floating snout which will not require excessive force to lift, but which will readily return to its down position once elevated.

From the above it is apparent that this invention provides a down corn attachment which may readily be mounted on an existing conventional corn head, or which may be incorporated into newly constructed equipment as an integral part thereof. Further, it is seen that this down corn attachment is extremely light weight particularly in that all idler sprockets, shafts, or the like and the necessary heavy framework that supports such shafts have been eliminated from the cantilevered structure of the snout. This becomes an important feature, particularly for large corn head such as Massey-Ferguson's eight-row corn head having nine row dividers. The excess weight added by prior down corn attachments on such a large corn head can be so great as to be prohibitive, particularly where the apparatus is to be employed in a muddy field, or a field which is very slick as a result of freezing or snow. Also, the attachment can readily be removed when the corn head is employed to pick standing corn. Removal of the attachment does not require disassembly of the structure of the corn head.

While I have disclosed preferred embodiments of my invention, I wish it understood that I do not intend to be restricted solely thereto, but that I do intend to include all embodiments thereof which would be apparent to one skilled in the art and which came within the spirit of the scope of my invention.

I claim:

1. In a corn head for a combine including a plurality of forwardly projecting row dividers each including a body portion and a pointed snout pivotally mounted on the forward end of said body portion for movement about a horizontal axis extending generally transverse to the direction of movement of the combine during the corn-picking operation, and corn crop conveyor means on said row dividers for delivering down corn in a position to be harvested by the corn head, the improvement wherein each said crop conveyor comprises, front guide means mounted on the forward pointed end of said snout, a conveyor chain mounted for movement about an endless path including a conveying run extending over said front guide means and along the top of said pivoted snout and said body to the rear portion of said row divider, means driving said conveyor chain about said endless path, and resilient chain-tensioning means applying a tensile load to said conveyor chain to apply a turning moment to said snout about said horizontal axis in a direction tending to lift said snout.

2. In a corn head for a combine as defined in claim 1, the further improvement comprising means limiting the moment applied to said snout by said chain to prevent lifting of said snout by said chain during operation of said corn head.

3. In a corn head as defined in claim 1, the further improvement comprising return guide means engaging and guiding the return run of said conveyor chain beneath the top surface of said row dividers, said return guide means being spaced rearwardly of said front guide means.

4. In a corn head as defined in claim 1, the further improvement comprising open track guide means supporting said chain above the top surface of said row dividers along said conveying run, said open track being adapted to permit pivotal movement of said snout relative to said body.

5. In a corn head as defined in claim 4 wherein said resilient means comprises a guide arm mounted beneath the top surface of said body portion and engaging the return run of said conveyor chain at a point spaced rearwardly from said snout, and spring means resiliently urging said arm and said return run downwardly to thereby apply a tensile load to said chain.

6. In a corn head as defined in claim 5, the further improvement wherein said guide arm engages said conveyor chain at a position to guide said return run below said horizontal axis whereby any turning moment applied to said snout by said return run will be in a direction tending to lower said snout.

7. In a corn head as defined in claim 1, the further improvement comprising resilient spring return means mounted on said body portion and engaging said snout to resist lifting movement of said snout and to urge said snout downward against force applied by said conveyor chain.

8. In a corn head as defined in claim 7, the further improvement wherein said resilient means comprises a guide arm mounted beneath the top surface of said body portion and engaging the return run of said conveyor chain beneath said top surface at a point spaced rearwardly of said snout, and spring means resiliently urging said guide arm and said return run downwardly to thereby apply a tensile load to said chain.

9. In a corn head as defined in claim 8, the further improvement comprising fixed guide means engaging said return run at a point between said guide arm and said front guide to continuously guide said return run along the bottom of said snout regardless of the pivoted position of said snout, whereby corn laying flat on the ground will be engaged by said return run beneath said snout and conveyed forwardly around said front guide.

10. The corn head as defined in claim 1 wherein the said front guide means comprises an open-ended boot member adapted to be telescoped onto the pointed end of said snout and retained thereon by the tensile load in said conveyor chain.

11. In the corn head as defined in claim 10, the further improvement wherein said front guide includes a downwardly extending skid member adapted to engage the ground to lift the pointed end of said snout over obstacles.

12. In the corn head as defined in claim 11, the further improvement comprising open track guide means supporting said chain above the top surface of said row dividers along said conveying run.

13. In the corn head as defined in claim 12, the further improvement wherein said open track guide means comprises a pivoted arm mounted for movement toward and away from the top surface of the said row divider, and cam means engaging said arm to move said arm away from said top surface upon upward pivotal movement of said snout, said arm engaging and supporting said conveyor chain when said chain is lifted from portions of said track by upward pivotal movement of the snout.

14. In the corn head as defined in claim 13, the further improvement wherein said conveyor chain is a high roller sprocket chain having outwardly extending lugs mounted on selected links thereof.

15. A corn head for a combine comprising a plurality of row dividers each including a body portion and a pointed snout, pivot means mounting said snout on the forward end of said body portion for limited pivotal movement about a horizontal axis adjacent the bottom of said body portion and extending substantially transverse to the direction of movement of the combine during the corn-picking operation, said snout overlapping the forward portion of said body during limited pivotal movement of said snout, front guide means defining a roller path around the pointed front end of said snout, top guide means mounted on the top surface of said snout and said body portion defining an articulated track from said front guide to a point adjacent the rear of said body, a roller chain conveyor mounted for movement around an endless path including a conveying run extending over said front guide and along said articulated track and a return run extending beneath the surface of said row divider from the rear of said body to said front guide, motor means driving said chain about an endless path, and resilient chain-tensioning means engaging and maintaining a tensile load in said chain to apply a force to said front guide creating a turning moment about said horizontal axis tending to raise said snout.

16. A corn head for a combine as defined in claim 15 further comprising means applying a turning moment to said snout in a direction tending to lower said snout.

17. A down corn gathering attachment for a corn head of the type including a forwardly projecting row divider having a body portion and a pointed snout pivotally mounted on the forward end of the body portion, said attachment comprising, in combination, a front chain guide having an opening therein adapted to telescopingly receive the front pointed end of the pivot snout, said front chain guide defining a fixed chain path extending around the point of the snout, a first guide track adapted to be mounted on the top surface of the snout, a second guide track adapted to be mounted on the top surface of the body portion, an endless high-roller conveyor chain, motor means adapted to be mounted on said row divider for driving said chain about an endless path including a conveying run extending around said front chain guide and said first and second guide tracks mounted on the row divider, and resilient chain-tensioning means adapted to be mounted on said row divider and engage said conveyor chain to maintain a tensile load in said chain for applying a turning moment tending to lift the pivoted snout.

18. The down corn gathering attachment as defined in claim 17 wherein said resilient chain-tensioning means comprises an elongated leaf spring adapted to have one end mounted on the frame of the row divider, and a guide shoe mounted on the other end of said leaf spring and adapted to be urged into engagement with said chain to apply said tensile load thereto.

19. The down corn gathering attachment as defined in claim 17 wherein said first and said second guide tracks each comprise means engaging and supporting said conveyor chain in vertically spaced relation with respect to the top surface of the row divider and cooperating to define an open bottom track for the conveyor chain.

20. The down corn gathering attachment as defined in claim 17 wherein said front chain guide includes a downwardly extending skid member adapted to engage the ground to lift the pointed end of the row divider snout over obstacles.

21. The down corn gathering attachment as defined in claim 17 wherein resilient chain-tensioning means comprises an elongated arm adapted to be pivotally mounted on the body portion of the row divider, and a resilient spring for continuously urging said arm downward into engagement with said conveyor chain.

22. The down corn gathering attachment as defined in claim 17 further comprising resilient snout return means adapted to be mounted on the forward portion of the row divider body portion and engage the snout at a point above the pivot axis of the snout to apply a turning moment to the snout in opposition to the turning moment applied by said chain.

23. A corn head for a combine including a plurality of forwardly projecting row dividers each comprising a body portion and a pointed snout pivotally mounted on the forward end of said body portion for movement about a horizontal axis extending generally transverse to the direction of movement of the combine during the corn-picking operation, a corn crop conveyor for delivering down corn into position to be harvested by said corn head, said corn crop conveyor including front guide means mounted on the forward pointed end of said snout, a conveyor chain mounted for movement about an endless path including a conveying run extending over said front guide means and along the top surface of said snout and said body portion, means driving said conveyor chain about said endless path, means continuously applying a turning moment to said snout about said horizontal axis in a direction tending to lift the forward end of said snout, and movable means engaging said conveyor chain for taking up any slack therein upon pivotal movement of said snout and said front guide means about said horizontal axis.

24. The corn head as defined in claim 23 wherein said movable means engaging said conveyor chain comprises resilient means applying and maintaining a tensile load on said chain.

* * * * *